US008879768B2

(12) United States Patent
Podoloff

(10) Patent No.: US 8,879,768 B2
(45) Date of Patent: Nov. 4, 2014

(54) EARPIECE HAVING ADJUSTABLE FRONT VENT

(71) Applicants: AAC Acoustic Technologies (Shenzhen) Co., Ltd., Shenzhen (CN); AAC Technologies Holdings Inc., Cayman Islands (GB)

(72) Inventor: Robert M. Podoloff, Framingham, MA (US)

(73) Assignees: AAC Acoustic Technologies (Shenzhen) Co., Ltd., Shenzhen (CN); AAC Technologies Holdings Inc., Cayman Islands (GB)

( * ) Notice: Subject to any disclaimer, the term of this patent is extended or adjusted under 35 U.S.C. 154(b) by 0 days.

(21) Appl. No.: 13/676,095

(22) Filed: Nov. 14, 2012

(65) Prior Publication Data

US 2014/0133668 A1    May 15, 2014

(51) Int. Cl.
*H04R 25/00*    (2006.01)
*H04R 31/00*    (2006.01)

(52) U.S. Cl.
CPC ..................................... *H04R 31/00* (2013.01)
USPC ........... 381/373; 381/370; 381/371; 381/372; 381/379; 381/380; 381/382

(58) Field of Classification Search
CPC ...... H04R 1/34; H04R 1/1016; H04R 1/1075; H04R 2460/11; H04R 2205/024
USPC .................................................. 381/370–384
See application file for complete search history.

(56) References Cited

U.S. PATENT DOCUMENTS

| 2,363,175 | A | * | 11/1944 | Grossman ..................... 381/322 |
| 5,729,605 | A | * | 3/1998 | Bobisuthi et al. ............. 379/430 |
| 2008/0298623 | A1 | * | 12/2008 | Klein et al. .................... 381/380 |
| 2011/0249856 | A1 | * | 10/2011 | Takei ............................. 381/380 |

* cited by examiner

*Primary Examiner* — Curtis Kuntz
*Assistant Examiner* — Ryan Robinson
(74) *Attorney, Agent, or Firm* — Anova Law Group, PLLC

(57) ABSTRACT

An earpiece is disclosed. The earpiece includes a housing forming a volume therein, a number of sound holes arranged in the front end and rear end of the housing, a sound generator accommodated in the volume, an ear gel attached to a front end of the housing, a wire electrically connected to the sound generator, wherein a adjusting module is assembled to the housing, a plurality of front vents are disposed on the front end of the housing, and the amount of the front vents communicating with the volume is mechanically altered by the adjusting module.

15 Claims, 6 Drawing Sheets

EARPIECE HAVING ADJUSTABLE FRONT VENT

FIELD OF THE INVENTION

The present disclosure generally relates to the art of sound transmitters, and more particularly, to an earpiece including a mechanically adjustable front vent.

DESCRIPTION OF RELATED ARTS

In recent years, portable audio playback apparatuses have widely proliferated. The audio playback apparatuses output audio from earphones, for example, and thereby provide the sound to users. For the earphones, various types are available and the taste of earphones often varies from user to user. As an example of the earphones, numbers of earphones, called sealing, in-ear canal type, are commercialized in which an earpiece is attached to a front end of a sound conduit.

A related earpiece generally includes a main housing, a front housing engaged with the main housing for forming a volume, a sound generator accommodated in the volume, and an ear gel attached to a front end of the front housing for inserting into an ear of the user. The sealed in-ear canal earpiece prevents the ambient sound into the ear canal of the user.

Sealed in-ear canal headphones are able to produce significant bass response while also isolating the listener from external sounds through the use of sealing ear gel. However, the sealing nature of in-ear canal headphones can also cause unwanted conditions like the "occlusion effect" which means internally generated sounds like breathing are artificially amplified, or "microphonics" which means noise is generates from objects rubbing against the cable or other headphone structures. Besides, the user might want to allow ambient sounds to enter so as to be alerted to outdoor hazards such as honking car horns or barking dogs when running.

So, it is necessary to provide a new earpiece for solving the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF AN EXEMPLARY EMBODIMENT

Figure 1:
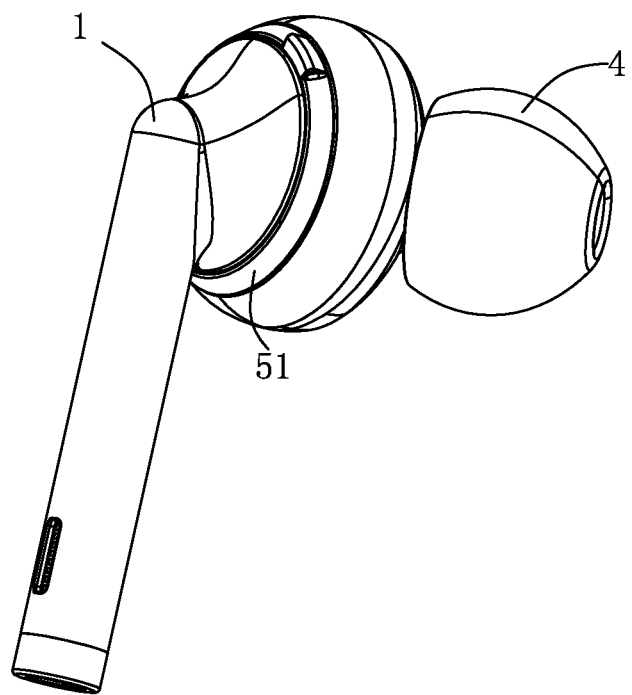
FIG. 1 is an isometric view of an earpiece in accordance with an exemplary embodiment of the present disclosure.

While the invention is susceptible of embodiments in many different forms, there is shown in the drawings and will herein be described in detail embodiment of the invention with the understanding that the present disclosure is to be considered as an exemplification of the principles of the invention and is not intended to limit the broad aspect of the invention to the embodiment illustrated.

Figure 2:
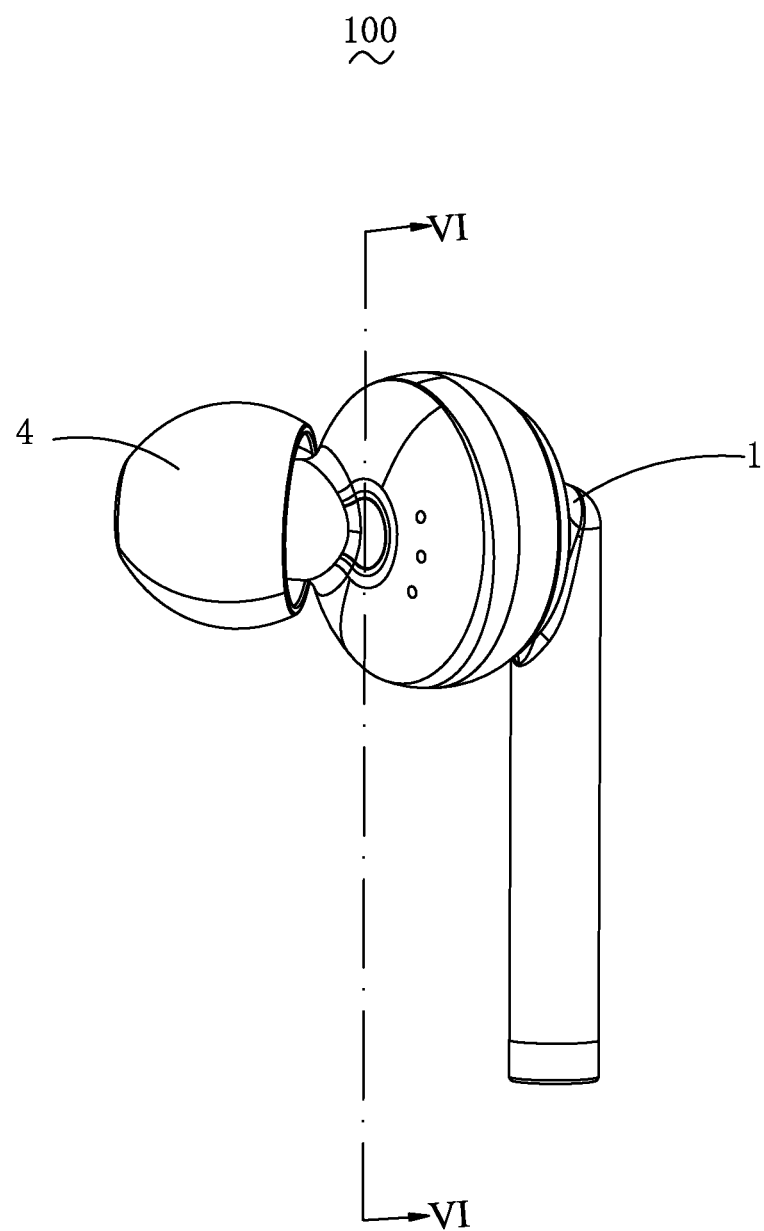
FIG. 2 is an isometric view of the earpiece in FIG. 1, from another aspect.
Figure 3:
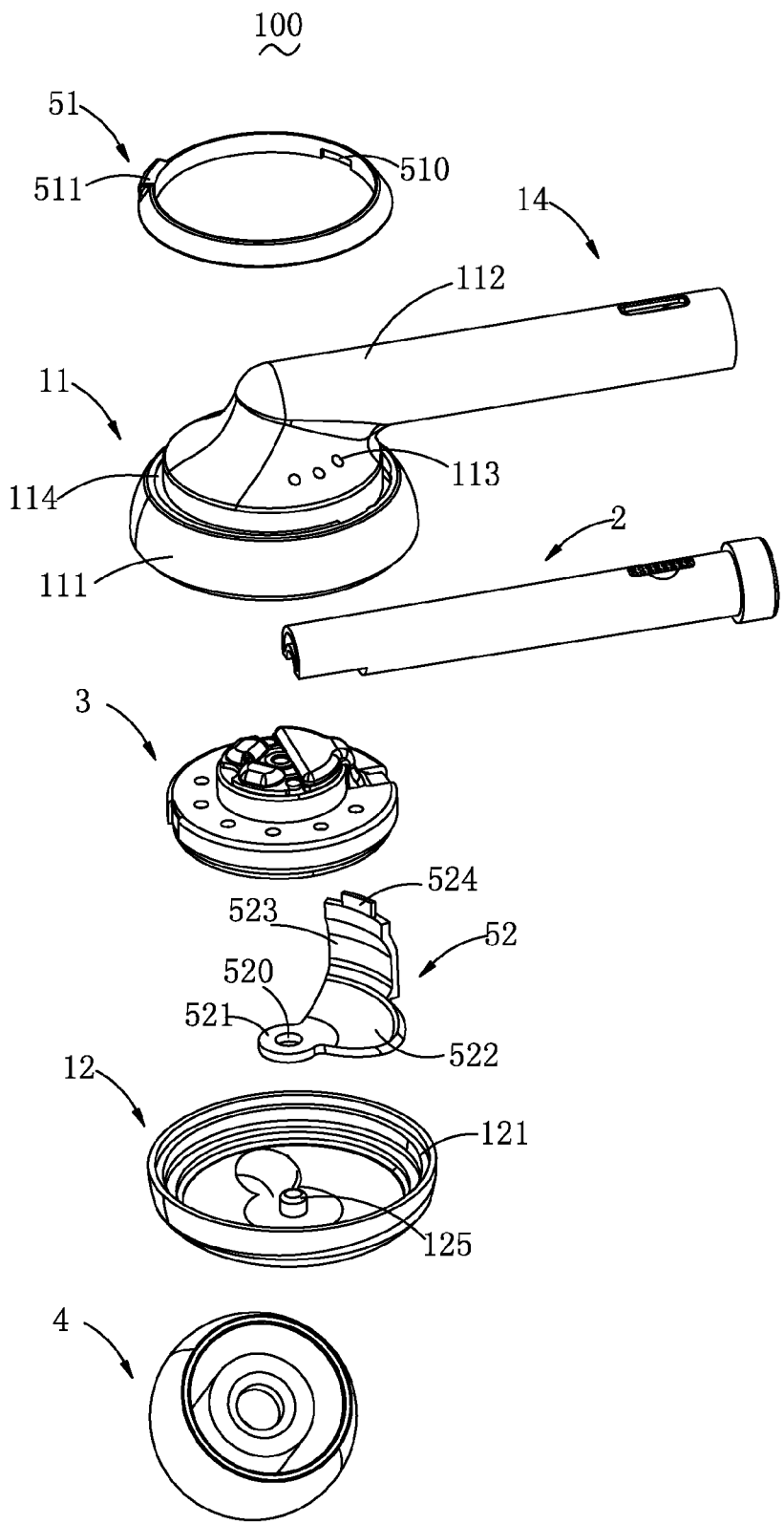
FIG. 3 is an exploded view of the earpiece in accordance with the exemplary embodiment of the present disclosure.
Figure 4:
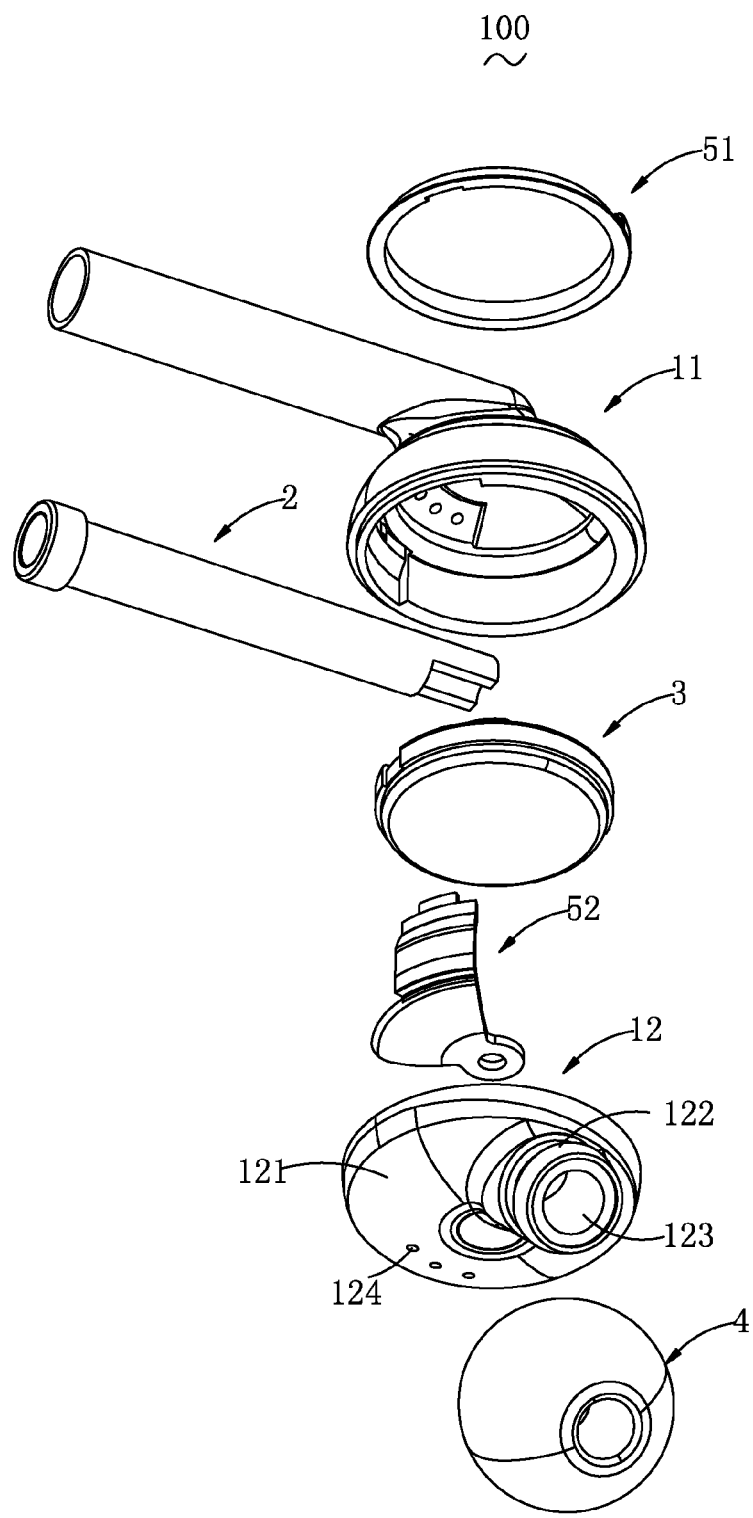
FIG. 4 is an exploded view of the earpiece in FIG. 3, from another aspect.
Figure 5:
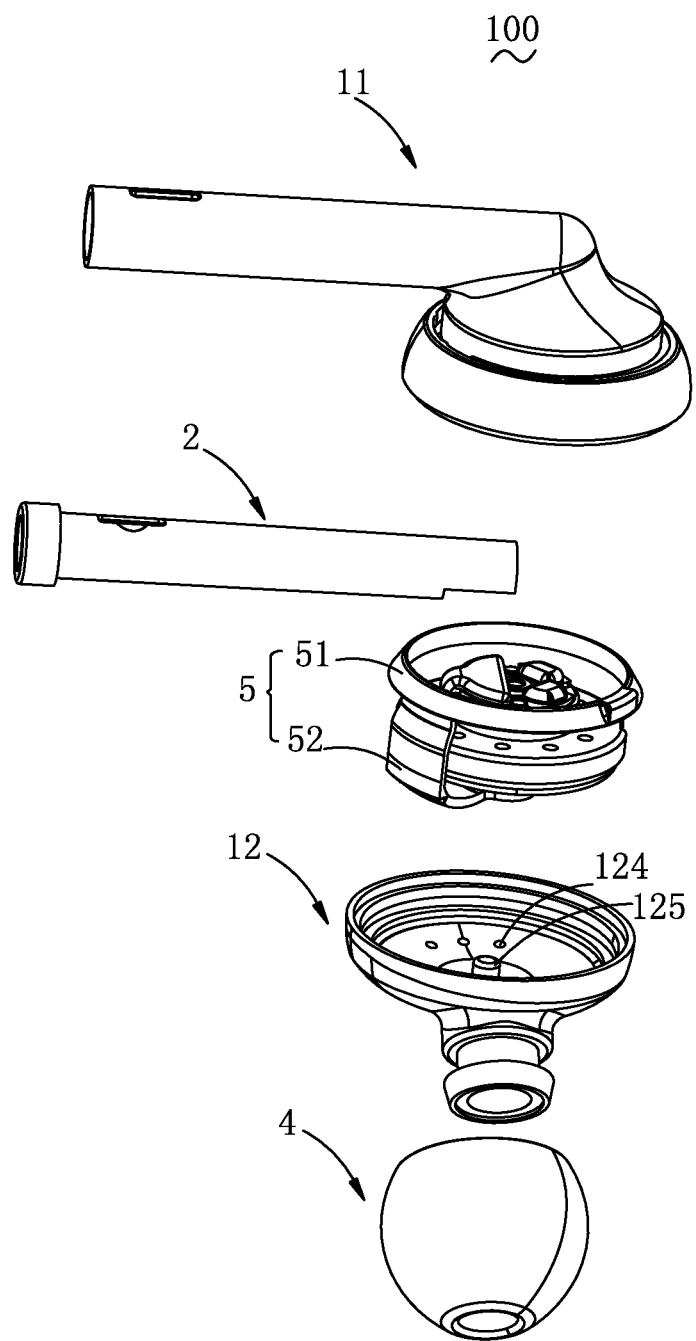
FIG. 5 is an isometric partially assembled view of the earpiece in FIG. 3.
Figure 6:
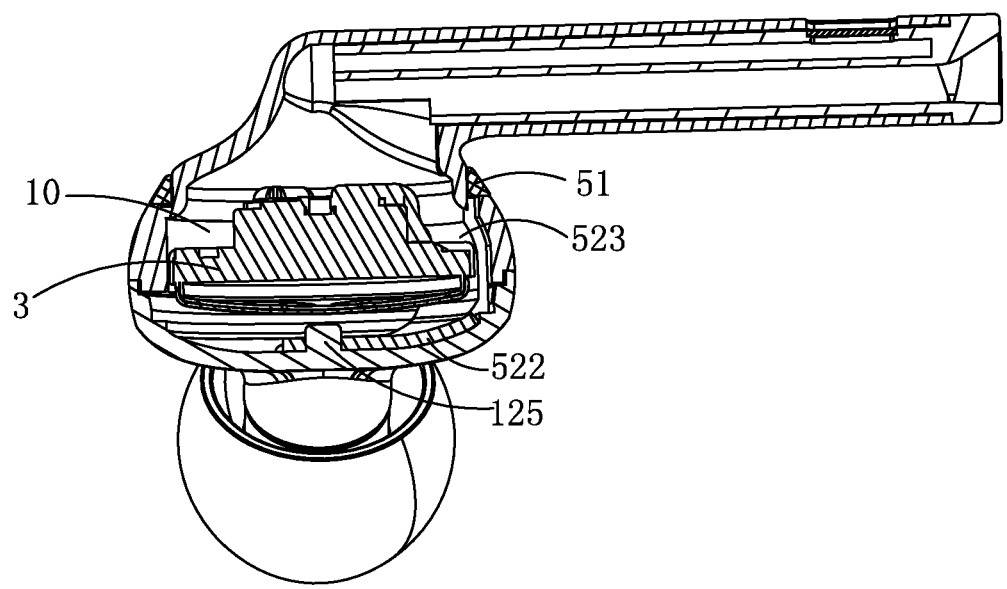
FIG. 6 is a cross-sectional view of the earpiece taken along line VI-VI in FIG. 2.

Referring to FIGS. 1-3, an earpiece 100, in accordance with an exemplary embodiment of the present disclosure, comprises a housing 1 including a main housing 11 and a front housing 12 engaged with the main housing 11 for forming a volume 10, a sound generator 3 accommodated in the volume 10 by mechanical connections with the housing 1, an ear gel 4 attached to a front end of the housing 1 for inserting into an ear canal of a user, a bass tube 2 partially accommodated in the main housing 11, a wire for connecting the sound generator 3 to an external device that provides audio signals, and a adjusting module 5 assembled to the housing 1.

The main housing 11 includes a back cover 111, a sleeve 112 integrally molded with the back cover 11 and enclosing the bass tube 2. A ring-shaped slot 114 is formed in the back cover 111. The front housing 12 includes a front cover 121, a sound output tube 122 extending slantingly forwards from the front cover 121. And the ear gel 14 is assembled to one end of the sound output tube 122.

The housing 1 includes a plurality of sound holes. In this embodiment, the sound holes comprise a plurality of first sound holes 113 in the rear end of the housing 1, and a second sound hole 123 in the front end of the housing 1. The housing 1 further includes a plurality of mechanically adjustable front vents 124 in the front end of the housing 1. The amount and shape of the sound holes and the front vents 124 may be adjusted or changed according to the requirements of design, manufacturing, or individual user.

The first sound hole 113 is formed in the back cover 111 of the main housing 11 used for communicating the volume 10 with the outside from the back end of the housing 1. The second sound hole 123 is formed in the sound output tube 122 for transmitting the sound produced by the sound generator 3 to the user's ear. The front vent 124 is formed in the front cover 121 of the front housing 12 for communicating the volume 10 with the outside from the front end of the housing 1 so as to allowing ambient sounds to enter.

Referring to FIGS. 2-5, the adjusting module 5 includes a rotatable ring 51 assembled to the main housing 11, and a rotor 52 assembled to the front housing 12 and received in the volume 10 and actuated by the ring 51. The rotor 52 includes a position portion 521 provided with a hole 520, a vent cover 522 connecting with the position portion 521, a connecting portion 523 extending from the vent cover 522 towards the ring 51, a protrusion 524 disposed at one end of the connecting portion 523 and engaged with a slot 510 formed on an inner face of the ring 51. The ring 51 further defines a lever 511 disposed on an outer face thereof and used for being pushed by the user's hand. In this embodiment, the vent cover 522 is fan-shaped.

The front housing 12 further includes a post 125 protruding from the center of an inner face of the front cover 121 and passing through the hole 520 of the rotor 52. The post 125 is serving as an axis of rotation of the rotor 52. The vent cover 522 is disposed on the inner face of the front cover 121 and capable of rotating about the post 125. The connecting portion 523 is disposed in a space formed between the sound generator 3 and a side wall of the housing 1 and capable of moving in the space. The ring 51 is received in a ring-shaped slot 114 of the main housing 11 and capable of moving along the slot 114 by pushing the lever 511.

The front vent 124 is disposed within a projection of the rotating region of the vent cover 522 onto the front cover 121.

Therefore, when the rotor 52 is actuated to rotate about the post 125 by pushing the ring 51, the vent cover 522 is moved to close or open the front vents 124 on the front cover 121. The amount of the open front vents 124 which is communicating with the volume 10 is mechanically altered by the adjustment module 5. In the embodiment, there are three front vents 124, and make one, two or all of the three front vents 124 open or close is easy to come true by moving the ring 5.

The present disclosure allows the user to control the amount of ambient sound that is admitted into the ear canal by control the amount of the open front vents 124 with the adjusting module 5. While using the headphones when running, the user could leave one or more front vents 124 open to allow the ambient sounds to enter so as to be alerted to outdoor hazards such as honking car horns or barking dogs. On the other hand, when watching a movie on an overseas flight, the user could close all the front vents 124 to have as much noise isolation as possible. Besides, the amount of the open front vents 124 also determines the perceived bass response of the headphone. It allows the user to vary the amount of apparent low frequency response the headset delivers.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An earpiece, comprising:
   a housing including a main housing and a front housing forming a volume with the main housing, a plurality of sound holes arranged in the housing;
   a sound generator accommodated in the volume;
   a bass tube partially accommodated in the main housing;
   a wire electrically connected to the sound generator; wherein
   the earpiece further includes a rotatable ring assembled to the main housing, a rotatable vent cover assembled to the front housing and actuated by the ring, a plurality of front vents formed in the front housing and within a projection of the rotating region of the vent cover onto the front housing; and
   wherein the ring is received in a ring-shaped slot formed on an outer face of the main housing and includes a lever disposed on an outer face of the ring.

2. The earpiece in claim 1, wherein the vent cover is disposed in the volume and disposed on an inner face of the front housing.

3. The earpiece in claim 2 further comprising a post protruding from an center of the inner face of the front housing, a position portion connecting with the vent cover and including a hole passed through by the post.

4. The earpiece in claim 3 further comprising a connecting portion extending from the vent cover towards the ring and a protrusion disposed at one end of the connecting portion and engaging with a slot formed on an inner face of the ring.

5. The earpiece in claim 4, wherein the vent cover is fan-shaped and rotatable about the post.

6. An earpiece, comprising,
   a housing forming a volume therein, a plurality of sound holes arranged in the front end and rear end of the housing;
   a sound generator accommodated in the volume;
   an ear gel attached to a front end of the housing;
   a wire electrically connected to the sound generator; wherein
   the earpiece further includes a adjusting module assembled to the housing, a plurality of front vents formed on the front end of the housing, and the amount of the front vents communicating with the volume is mechanically altered by the adjusting module;
   wherein the housing includes a main housing and a front housing, the main housing includes a back cover and a sleeve integrally molded with the back cover, the front housing includes a front cover and a sound output tube extending slantingly forwards from the front cover with the ear gel assembled to the sound output tube; and
   wherein the adjusting module includes a rotatable ring assembled to the main housing, and a rotatable rotor assembled to the front housing and received in the volume and actuated by the ring.

7. The earpiece in claim 6, wherein the ring is provided with a lever on an outer face thereof and received in a ring-shaped slot formed on an outer face of the back cover of the main housing.

8. The earpiece in claim 7, wherein the rotor includes a position portion provided with a hole and positioned to the front cover, a vent cover rotatablely disposed on an inner face of the front cover, a connecting portion extending from the vent cover towards the ring, a protrusion disposed at one end of the connecting portion and engaged with a slot formed on an inner face of the ring.

9. The earpiece in claim 8, wherein the front housing further includes a post protruding from the center of the inner face of the front cover and passing through the hole of the rotor and serving as an axis of rotation of the rotor.

10. The earpiece in claim 9, wherein the plurality of front vents are disposed in the front cover and within a projection of the rotating region of the vent cover onto the front cover.

11. The earpiece in claim 6, wherein the sound holes include a plurality of first sound holes formed in the back cover of the main housing used for communicating the volume with the outside from the back end of the housing, a second sound hole formed in the sound output tube for transmitting the sound produced by the sound generator to an user's ear.

12. An earpiece, comprising
   a housing forming a volume therein;
   a sound generator accommodated in the volume;
   an adjusting module assembled to the housing including a rotatable actuator partially exposing outside of the housing and a rotor accommodated in the volume; wherein
   the earpiece further includes at least one front vent disposed in the front end of the housing, and the amount of the front vent communicating with the volume is altered by the adjusting module; and
   wherein the actuator is a ring assembled to a ring-shaped slot formed on an outer face of the housing and is provided with a lever on an outer face thereof.

13. The earpiece in claim 12, wherein the rotor includes a position portion provided with a hole and positioned to the housing, a vent cover rotatablely disposed on an inner face of the housing, a connecting portion extending from the vent cover towards the ring, a protrusion disposed at one end of the connecting portion and engaged with a slot formed on an inner face of the ring.

14. The earpiece in claim 13, wherein the housing further includes a post protruding from the center of the inner face of the housing and passing through the hole of the rotor and serving as an axis of rotation of the rotor.

15. The earpiece in claim 14, wherein the front vent is disposed within a projection of the rotating region of the vent cover onto the inner face of the housing.

\* \* \* \* \*